US010657517B2

(12) United States Patent
Blackwell

(10) Patent No.: US 10,657,517 B2
(45) Date of Patent: May 19, 2020

(54) METHODS AND SYSTEMS FOR USING A TRANSACTION CARD ON A TRANSPORTATION VEHICLE

(71) Applicant: Panasonic Avionics Corporation, Lake Forest, CA (US)

(72) Inventor: Nigel Blackwell, Lake Forest, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 743 days.

(21) Appl. No.: 15/194,927

(22) Filed: Jun. 28, 2016

(65) Prior Publication Data

US 2017/0372296 A1    Dec. 28, 2017

(51) Int. Cl.
   *G06Q 40/00*   (2012.01)
   *G06Q 20/34*   (2012.01)
   *G06K 9/32*    (2006.01)
   *H04N 5/232*   (2006.01)
   *H04N 5/235*   (2006.01)

(52) U.S. Cl.
   CPC ............. *G06Q 20/34* (2013.01); *G06K 9/325* (2013.01); *H04N 5/2354* (2013.01); *H04N 5/23267* (2013.01)

(58) Field of Classification Search
   CPC ..................................................... G06Q 20/34
   USPC ......................................................... 705/39
   See application file for complete search history.

(56) References Cited

U.S. PATENT DOCUMENTS

| 8,165,423 | B2 | 4/2012 | Lai et al. | |
|---|---|---|---|---|
| 8,837,833 | B1 * | 9/2014 | Wang | G06K 9/3283 382/182 |
| 9,003,454 | B2 * | 4/2015 | Keen | H04N 21/4222 725/76 |
| 9,026,462 | B2 * | 5/2015 | Lin | G06Q 20/042 705/16 |
| 9,160,946 | B1 * | 10/2015 | Semenov | H04N 5/357 |
| 9,355,396 | B1 * | 5/2016 | Alkasimi | H04W 4/80 |
| 2006/0075934 | A1 * | 4/2006 | Ram | B60N 3/004 108/44 |
| 2010/0082444 | A1 * | 4/2010 | Lin | G06Q 20/042 705/17 |
| 2014/0032406 | A1 * | 1/2014 | Roach | G06Q 20/042 705/42 |
| 2016/0019530 | A1 * | 1/2016 | Wang | G06K 9/00442 705/39 |

OTHER PUBLICATIONS

In-Flight Entertainment: The sky's the limit by Gerald Lui-Kwan Boeing Entertainment Computing IEEE Computer (vol. 33, issue :10 , Oct. 2000) (Year: 2000).*

* cited by examiner

*Primary Examiner* — Bruce I Ebersman
*Assistant Examiner* — John A Anderson
(74) *Attorney, Agent, or Firm* — Klein, O'Neill & Singh, LLP

(57) ABSTRACT

Methods and systems for a transportation vehicle are provided. For example, one method includes initializing a transaction mode for using a transaction card having a front portion and a rear portion from a seat device of a transportation vehicle; adjusting lighting from the seat device to capture an image of the transaction card; capturing the image of the transaction card using a camera of the seat device; and processing the image of the transaction card and extracting information from the image of the transaction card.

20 Claims, 7 Drawing Sheets

METHODS AND SYSTEMS FOR USING A TRANSACTION CARD ON A TRANSPORTATION VEHICLE

TECHNICAL FIELD

The present disclosure relates to capturing information from a transaction card using a camera on a transportation vehicle.

BACKGROUND

Transportation vehicles, for example, aircraft, trains, buses, recreation vehicle, boats and other similar vehicles use various computing devices for providing many functions, including conducting commercial transactions for goods/services, accessing and playing entertainment content and others. These devices include hardware (for example, servers, switches, network interface cards, storage adapters, storage devices and others) and software (for example, server applications, operating systems, firmware, management applications, application programming interface (APIs) and others).

Conventional systems in transportation vehicles do not provide an efficient mechanism for capturing information from transaction cards for conducting a transaction or for any other reasons. Continuous efforts are being made to efficiently capture transaction card information.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

In one aspect, methods and systems for a transportation vehicle are provided. For example, one method includes initializing a transaction mode for using a transaction card having a front portion and a rear portion from a seat device of a transportation vehicle; adjusting lighting from the seat device to capture an image of the transaction card; capturing the image of the transaction card using a camera of the seat device; and processing the image of the transaction card and extracting information from the image of the transaction card.

Figure 1A:
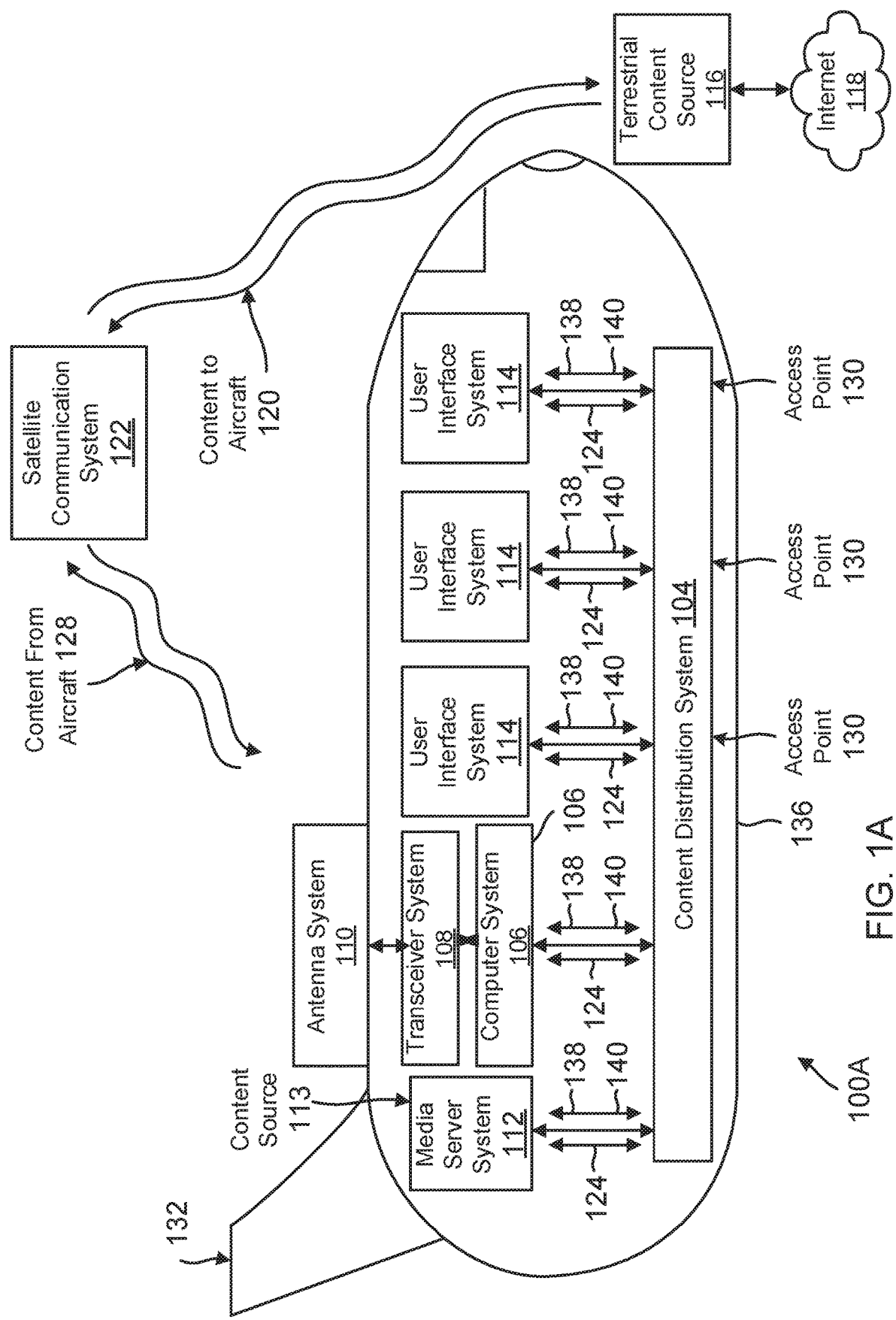
FIG. 1A shows an example of an operating environment for implementing the various aspects of the present disclosure in an aircraft.

Vehicle Information System:

FIG. 1A shows an example of a generic vehicle information system 100A (also referred to as system 100A) that can be configured for installation aboard an aircraft 132 and is enabled to capture information from a transaction card using a seat device camera, according to one aspect of the present disclosure. A transaction card may be credit card, debit card, a frequent flier card, a membership card or any other similar card. The various adaptive aspects described herein are not limited to any specific card type.

As an example, system 100A can comprise a conventional aircraft passenger in-flight entertainment (IFE) system, such as the Series 2000, 3000, eFX, eX1, eX2, eX3, eXW, eXO and/or any other in-flight entertainment system developed and provided by Panasonic Avionics Corporation (without derogation of any trademark rights of Panasonic Avionics Corporation) of Lake Forest, Calif.

System 100A may include a content source 113 and one or more user (or passenger) interface systems (may also be referred to as a seatback device) 114 that communicate with a real-time content distribution system 104. The content source 113 may include one or more internal content sources, such as a media server system 112, that are installed aboard the aircraft 132, one or more remote (or terrestrial) content sources 116 that can be external from the aircraft 132, or a distributed content system. The media server system 112 can be provided as an information system controller for providing overall system control functions for system 100A and/or for storing viewing content 124. The viewing content 124 may include pre-programmed viewing content and/or any viewing content 120 received via a satellite communication system 122, as desired. The viewing content 124 can include television programming content, music content, podcast content, photograph album content, audiobook content, and/or movie content without limitation. The viewing content as shown and described herein are not exhaustive and are provided herein for purposes of illustration only and not for purposes of limitation.

The server system 112 can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system, a solid state drive (SSD) system, or other forms of non-volatile memory (NVM), or a hard disk drive (HDD) system, of any suitable kind, for storing the preprogrammed content and/or the viewing content 120.

The viewing content 124 can comprise any conventional type of audio and/or video viewing content, such as stored (or time-delayed) viewing content and/or live (or real-time) viewing content. As desired, the viewing content 124 can include geographical information. Alternatively, and/or additionally, to entertainment content, such as live satellite television programming and/or live satellite radio programming, the viewing content likewise can include a public announcement and two-way communications, such as real-time access to the Internet 118 and/or telecommunications.

Being configured to distribute and/or present the viewing content 124 provided by one or more selected content sources 113, system 100A can communicate with the content sources 113 in real time and in any conventional manner, including via wired and/or wireless communications. System 100A and the terrestrial content source 116, for example, can communicate directly and/or indirectly via an intermediate communication system, such as a satellite communication system 122. System 100A thereby can receive viewing content 120 from a selected terrestrial content source 116 via satellite communication system 122 and/or transmit content 128 to the satellite communication system 122, including navigation and other control instructions, to the terrestrial content source 116.

As desired, the terrestrial content source 116 can be configured to communicate with other terrestrial content sources (not shown). Although shown and described as comprising the satellite communication system 122 for purposes of illustration, the communication system can comprise any conventional type of wireless communication system, such as a cellular communication system (not shown) and/or other aircraft to offboard communication system (not shown).

To facilitate communications with the terrestrial content sources 116, system 100A may also include an antenna system 110 and a transceiver system 108 for receiving the viewing content from the remote (or terrestrial) content sources 116. The antenna system 110 preferably is disposed outside, such as an exterior surface of a fuselage 136 of the aircraft 132. The antenna system 110 can receive viewing content 124 from the terrestrial content source 116 and provide the received viewing content 124, as processed by the transceiver system 108, to a computer system 106 of system 100A. The computer system 106 can provide the received viewing content 124 to the media (or content) server system 112 and/or directly to one or more of the user interfaces 114, as desired. Although shown and described as being separate systems for purposes of illustration, the computer system 106 and the media server system 112 can be at least partially or fully integrated.

The user interface system 114 may be computing terminals in communication with an access point 130. The user interface system 114 provides a display device, for example, a smart monitor, to view content. The user interface system 114 includes a hardware interface to connect to an access point 130 that provides a wired and/or a wireless connection for the user interface system. In at least one embodiment, the user interface system (also referred to as a seatback device) 114 comprises a software application that a user downloads and installs on a personal user device carried aboard by a user (a personal electronic device or "PED") to receive and view content via an access point 130. While bandwidth limitation issues may occur in a wired system on a vehicle, such as an aircraft 132, in general the wired portion of the vehicle information 100A system is designed with sufficient bandwidth to support all users aboard the vehicle, i.e., passengers.

The user interface system 114 can include an input system (not shown) for permitting the user (or passenger) to communicate with system 100A, such as via an exchange of control signals 138. For example, the input system can permit the user to enter one or more user instructions 140 for controlling the operation of system 100A. Illustrative user instructions 140 can include instructions for initiating communication with the content source 113, instructions for selecting viewing content 124 for presentation, and/or instructions for controlling the presentation of the selected viewing content 124. If a fee is required for accessing the viewing content 124, for a Wi-Fi session, ordering food/beverages, shopping or for any other reason, payment information can be obtained using a camera of a seat device, described below in detail.

In one aspect, the user interface system 114 is provided at individual passenger seats of aircraft 132. The user interface system 114 can be adapted to different aircrafts and seating arrangements.

Figure 1B:
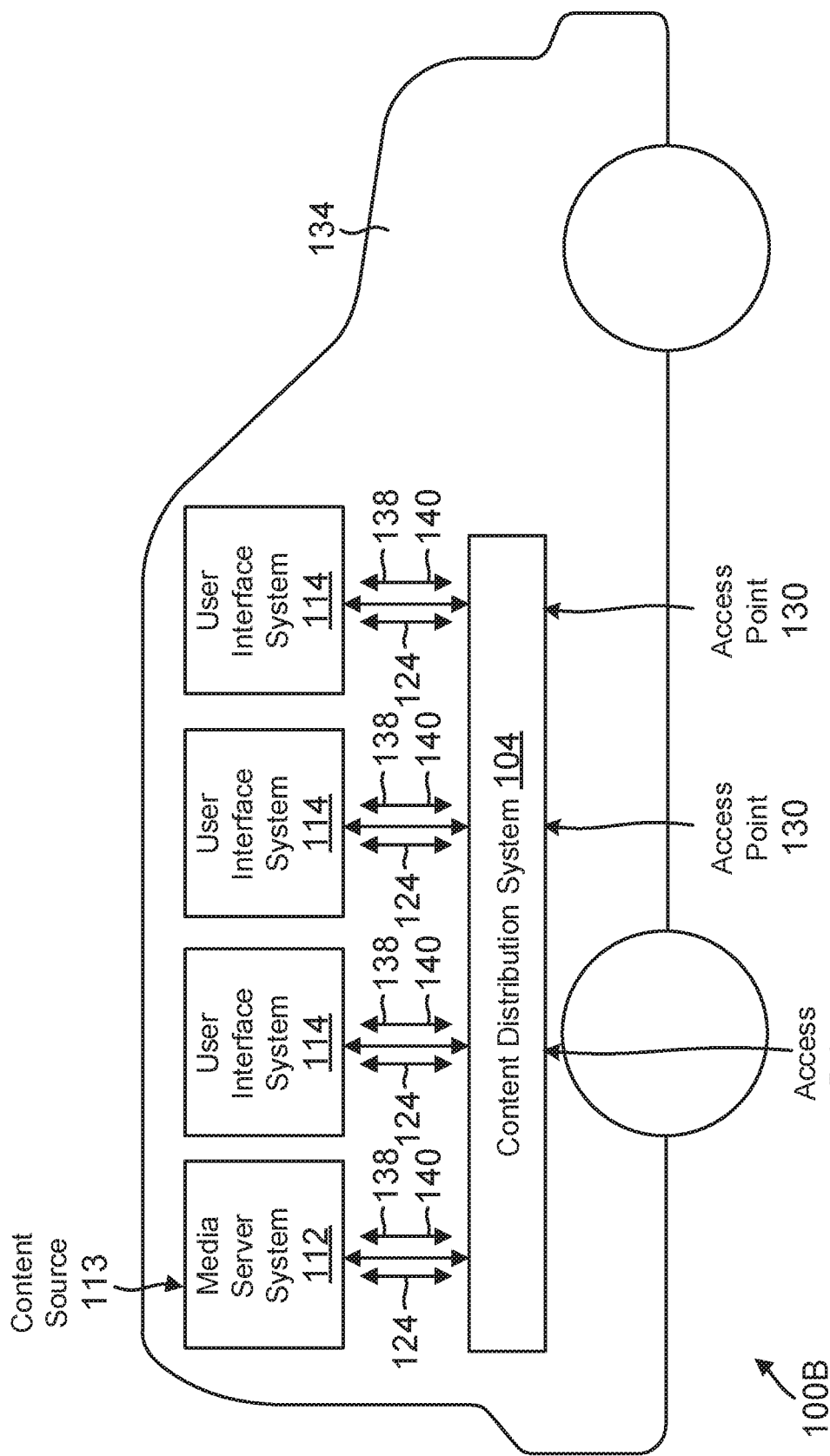
FIG. 1B shows an example of the operating environment on another transportation vehicle type, according to one aspect of the present disclosure.

FIG. 1B shows an example of implementing the vehicle information system 100B (may be referred to as system 100B) on an automobile 134 that may include a bus, a recreational vehicle, a boat, and/or a train, or any other type of passenger vehicle without limitation. The various components of system 100B may be similar to the components of system 100A described above with respect to FIG. 1A and for brevity are not described again.

Figure 2:
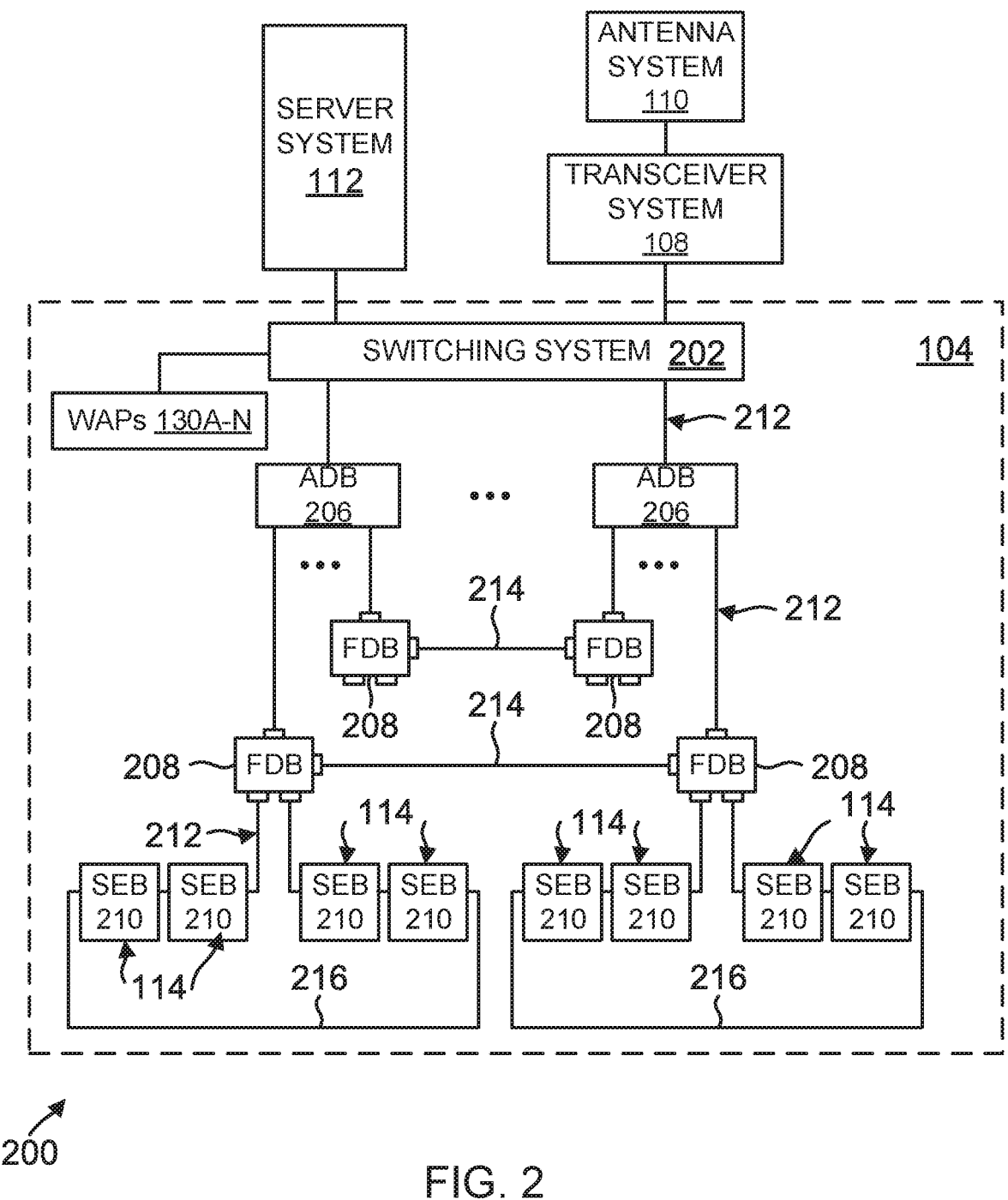
FIG. 2 shows an example of a content distribution system, used according to one aspect of the present disclosure.

Content Distribution System:

FIG. 2 illustrates an example of the content distribution system 104 for the vehicle information system 200 (similar to 100A/100B), according to one aspect of the present disclosure. The content distribution system 104 couples, and supports communication between the server system 112, and the plurality of user interface systems 114.

The content distribution system 104, for example, can be provided as a conventional wired and/or wireless communication network, including a telephone network, a local area network (LAN), a wide area network (WAN), a campus area network (CAN), personal area network (PAN) and/or a wireless local area network (WLAN), of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANS), which also are known as WiMax Wireless Broadband, in accordance with IEEE Standard 802.16. Preferably being configured to support high data transfer rates, the content distribution system 104 may comprise a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps) or any other transfer rate. To achieve high data transfer rates in a wireless communications environment, free-space optics (or laser) technology, millimeter wave (or microwave) technology, and/or Ultra-Wideband (UWB) technology can be utilized to support communications among the various system resources, as desired.

As illustrated in FIG. 2, the distribution system 104 can be provided as a plurality of area distribution boxes (ADBs) 206, a plurality of floor disconnect boxes (FDBs) 208, and a plurality of seat electronics boxes (SEBs) (and/or video seat electronics boxes (VSEBs) and/or premium seat electronics boxes (PSEBs)) 210 being configured to communicate in real time via a plurality of wired and/or wireless communication connections 212. The distribution system 104 likewise can include a switching system 202 for providing an interface between the distribution system 104 and the server system 112. The switching system 202 can comprise a conventional switching system, such as an Ethernet switching system, and is configured to couple the server system 112 with the area distribution boxes 206. Each of the area distribution boxes 206 is coupled with, and communicates with, the switching system 202. In addition, the distribution system 104 includes one or more wireless access points (WAPs) (130A to 130N) connected in communication with the switch system 202 for wireless distribution of content.

Each of the area distribution boxes 202, in turn, is coupled with, and communicates with, at least one floor disconnect box 208. Although the area distribution boxes 206 and the associated floor disconnect boxes 208 can be coupled in any conventional configuration, the associated floor disconnect boxes 208 preferably are disposed in a star network topology about a central area distribution box 206 as illustrated in FIG. 2. Each floor disconnect box 208 is coupled with, and services, a plurality of daisy-chains of seat electronics boxes 210. The seat electronics boxes 210, in turn, are configured to communicate with the user interface systems 114. Each seat electronics box 210 can support one or more of the user interface systems 114.

The switching systems 202, the area distribution boxes 206, the floor disconnect boxes 208, the seat electronics boxes (and/or video seat electronics boxes (VSEBs) and/or premium seat electronics boxes (PSEBs)) 210, the antenna system 110, the transceiver system 108, the content source 113, the server system 112, and other system resources of the vehicle information system preferably are provided as line replaceable units (LRUs). The use of LRUs facilitate maintenance of the vehicle information system 200 because a defective LRU can simply be removed from the vehicle information system 200 and replaced with a new (or different) LRU. The defective LRU thereafter can be repaired for subsequent installation. Advantageously, the use of LRUs can promote flexibility in configuring the content distribution system 104 by permitting ready modification of the number, arrangement, and/or configuration of the system resources of the content distribution system 104. The content distribution system 104 likewise can be readily upgraded by replacing any obsolete LRUs with new LRUs.

The distribution system 104 may also include at least one FDB internal port bypass connection 214 and/or at least one SEB loopback connection 216. Each FDB internal port bypass connection 214 is a communication connection 212 that permits floor disconnect boxes 208 associated with different area distribution boxes 206 to directly communicate. Each SEB loopback connection 216 is a communication connection 212 that directly couples the last seat electronics box 210 in each daisy-chain of seat electronics boxes 210 for a selected floor disconnect box 208 as shown in FIG. 2. Each SEB loopback connection 216 therefore forms a loopback path among the daisy-chained seat electronics boxes 210 coupled with the relevant floor disconnect box 208. It is noteworthy that the various aspects of the present disclosure may be implemented without using FDB 208. When FDB 208 is not used, ADB 206 communicates directly with SEB 210 and/or server system 112 may communicate directly with SEB 210 or the seats. The various aspects of the present disclosure are not limited to any specific network configuration.

Figure 3A:
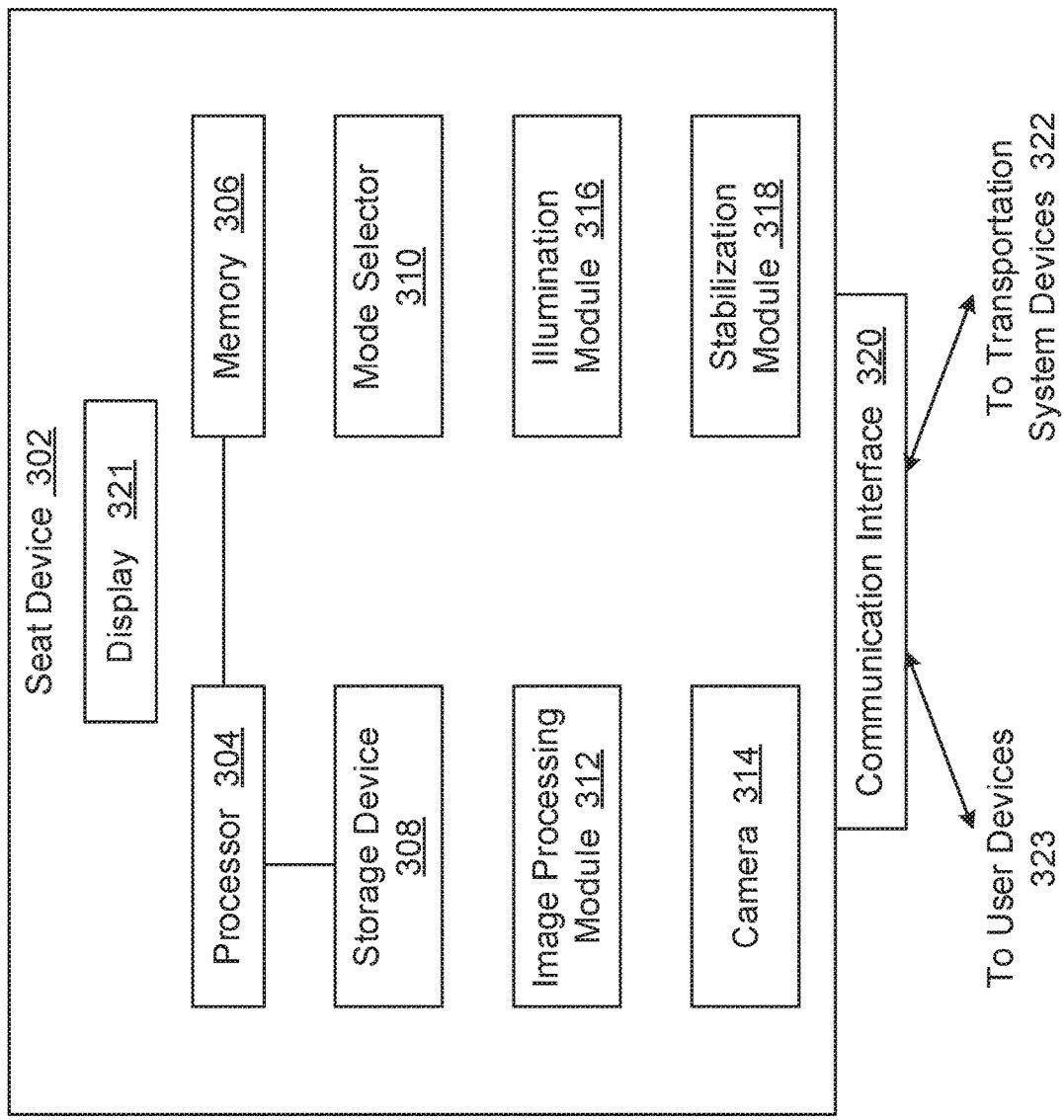
FIGS. 3A-3B show examples of systems for capturing transaction card information, according to one aspect of the present disclosure.

Transaction Card Capture System:

FIG. 3A shows an example of a system 300 for capturing information from a transaction card on a transportation vehicle, for example, an aircraft, according to one aspect of the present disclosure. System 300 shows a seat device 302 that is available at a passenger seat for capturing information from a transaction card, according to one aspect. Seat device 302 may be positioned in front of the passenger seat, coupled to the chair or placed in a manner that enables the passenger to view content at the seat device. The various aspects of the present disclosure are not limited to any specific orientation of the seat device 302.

Seat device 302 includes a communication interface 320 that communicates with other systems 322 (for example, media server 112, computer system 106, passenger service system 350, such as reading and attendant call lights 352 and 354, and others) and user devices 323. User devices 323 include PEDs used by the passengers and crew of a transportation vehicle.

Seat device 302 includes a display 321 that displays content to a user. In one aspect, display 321 may operate as a touch screen to receive user input directly at the seat device 302.

Seat device 302 may include one or more processors 304 having access to a memory 306 and storage 308. The processor 304 controls the overall operation of the seat device 302. In certain aspects, processor 304 accomplishes this by executing software instructions out of memory 306.

Processor 304 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices. Memory 306 represents any form of random access memory (RAM), read-only memory (ROM), flash memory, or the like, or a combination of such devices. Storage device 308 may be, or may include any conventional medium for storing data in a non-volatile manner, such as one or more solid state devices, magnetic or optical based disks or any other type of storage.

Seat device 302 includes a mode selector 310 that may be provided as a push button, an icon at the display 321 or otherwise. The mode selector 310 triggers a transaction mode at the seat device 302 to enable the seat device 302 to capture information from the front as well as the back of a transaction card using a camera 314.

In one aspect, the camera 314 captures an image from the transaction card for a transaction. The transaction may be to purchase goods and services from the transportation vehicle, manage account information or perform any other task related to the transaction card from the transportation vehicle. The captured image is provided to an image processing module 312 that extracts the card number, name, expiration date and other data. The information may be extracted by performing optical character recognition (OCR). The extracted information may be encrypted and stored securely at storage 308. The extracted information is provided to another application (not shown) for completing the transaction.

In one aspect, the seat device 302 includes a stabilization module 318 that offsets any image distortion that may occur when a passenger holds the transaction card for image capture, for example, due to turbulence buffeting an aircraft or for any other reason, such as aircraft maneuvering, vibration, etc. This enables the camera 314 to accurately take images of the transaction card.

In another aspect, seat device 302 also includes an illumination module 316 that manages lighting for image capture. For example, lighting in an aircraft may not be optimum for taking a picture. When the mode selector 310 is selected to capture the card information, display 321 may provide a bright, all-white background to capture the image, at maximum brightness. In another aspect, the illumination module 316 may ascertain the most prominent color of the transaction card and apply appropriate color filters or provided a background color on the display, other than white, to maximize the contrast between alphanumeric characters on the card and the prominent card color. In another aspect, where available, the illumination module 316 enables overhead and other lighting to capture the image of the transaction card. For example, the illumination module 316 may active the passenger reading light 352 to provide more illumination.

Figure 3B:
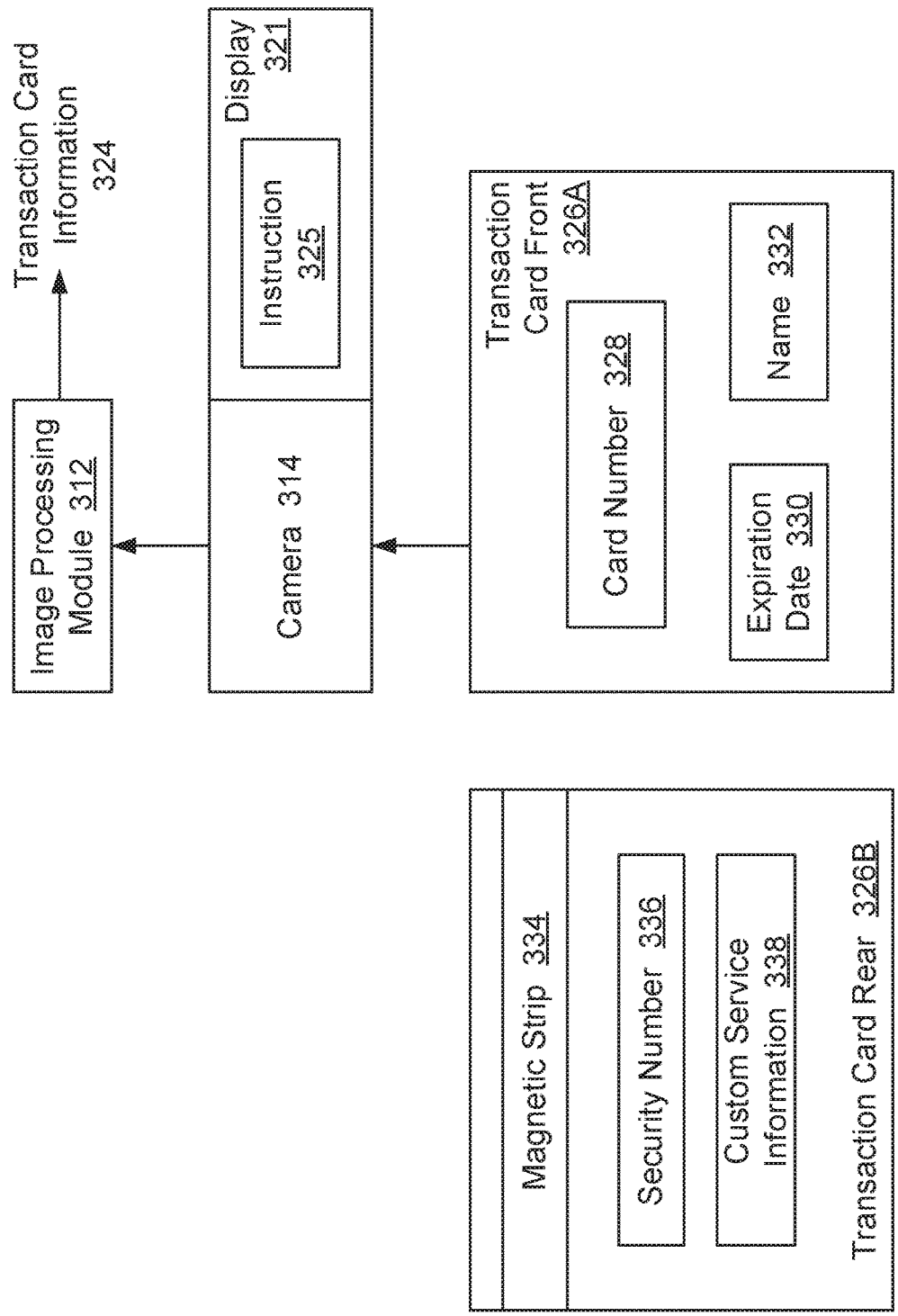

FIG. 3B shows an example of capturing transaction information using camera 314, according to one aspect of the present disclosure. When the transaction mode is selected, instructions 325 to place the card in front of the camera may be displayed on the display device 321.

The front portion 326A of a transaction card 326 is placed or held in front of the camera 314. The card includes a card number 328, expiration 330 and name of the card holder 332. The captured image is provided to the image processing module 312 that extracts the transaction card information 324 and provides the information 324 to processor 304 or any other module.

It is noteworthy the same process above applies to capture the image of the back side 326B of the card that includes a magnetic strip 334, a security number 336 and customer service information 338. Details of using seat device 302 to capture information from a transaction card are now provided.

Figure 4:
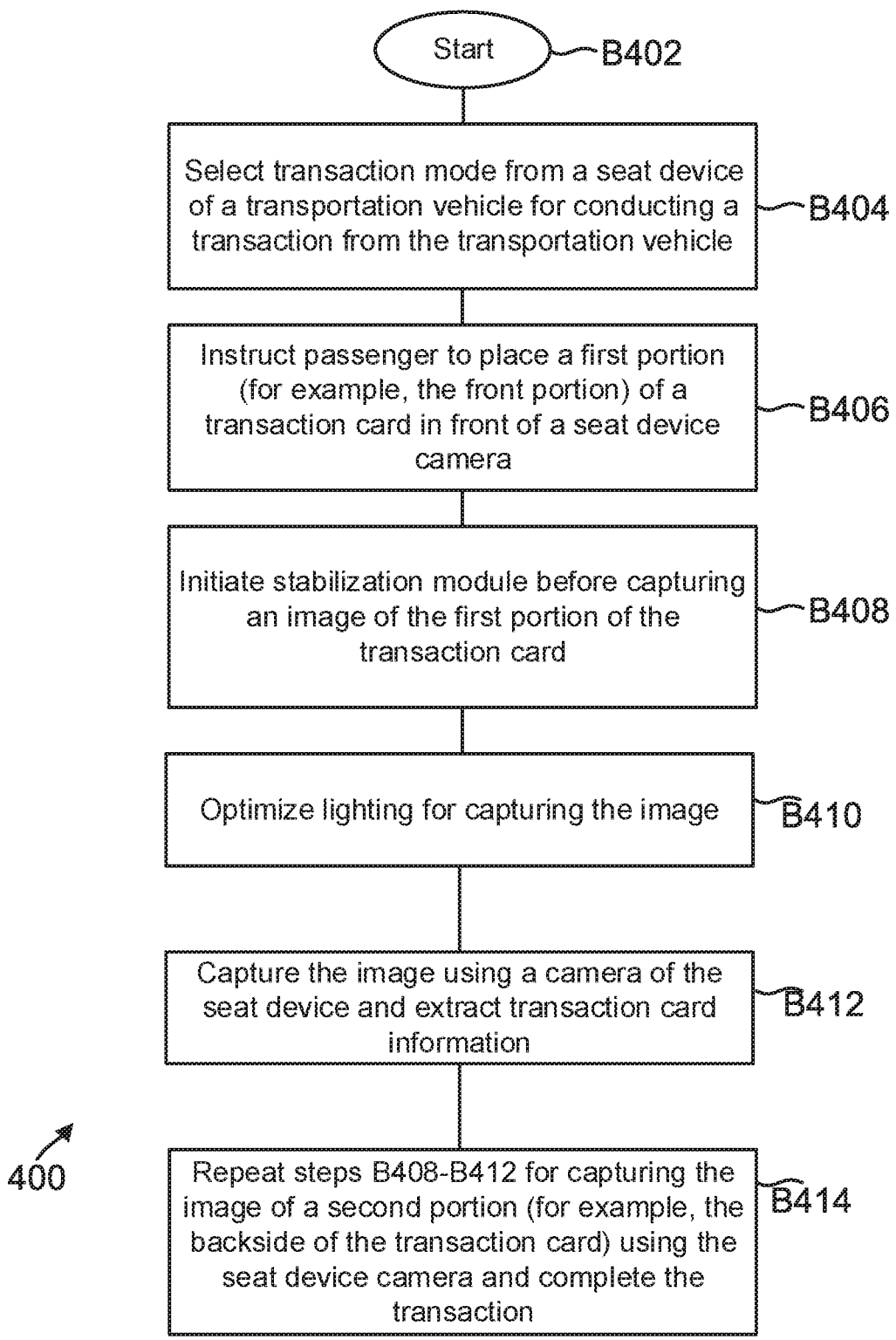
FIG. 4 shows a process flow for capturing transaction card information, according to one aspect of the present disclosure.

Process Flow:

FIG. 4 shows a process 400 for capturing transaction card information using a seat device 302, according to one aspect of the present disclosure. The process begins in block B402 when seat device 302 is initialized and operational. A passenger may want to conduct a transaction for example, to buy a product, view or download a movie, and access their account on-line or for any other reason.

In block B404, the passenger selects a "transaction" mode from the seat device 302 for conducting a transaction. The mode may be selected using the mode selector 310.

In block B406, the seat device instructs the passenger to place the card in front of the camera 314. The instructions 325 may appear as text at display 321 or audio/video instructions.

In block B408, the stabilization module 318 is initialized to stabilize and offset any instability due to the passenger's ability to hold the card and/or the operating environment, for example, turbulence, aircraft maneuvering, engine vibration, or other reasons.

In block B410, the illumination module 316 optimizes the lighting for capturing the image. As explained above, this may be enabled by presenting an all-white display at the seat device 302 at maximum brightness, and/or determining the most prominent color of the credit card and applying an appropriate filter. As an alternative to providing an all-white display, on the seat device 302, a color may be provided to enhance recognition of alphanumeric characters on the card. For instance, if the card is mostly red, i.e., reflects primarily red light and absorbs all other colors, the display may provide red light for maximum contrast between black lettering on the card (areas that absorb all visible light) and areas that reflect light for better optical character recognition (OCR). Additionally, if the information lettering on the card is silver/gold/white and reflects light better than the colored background, then a complementary lighting color such as blue or green may be displayed by the seat device in order to make the background color darker and thus enhance the contrast with the lighter information lettering. In another aspect, the color displayed at the seat device will depend on the color of the transaction card.

In block B412, the camera 314 captures the image of a first portion (for example, the front 326A) of the transaction card. The captured image is processed by the image processing module 312 that extracts the transaction card information, for example, by performing optical character recognition (OCR). In one aspect, information from the transaction card is retrieved from both sides (i.e. 326A/326B) and the transaction is completed in block B414.

The adaptive aspects described herein have advantages. For example, a user does not have to manually enter the transaction card information on a flight, which can be error prone, instead the seat device 302 with a camera captures the image using proper lighting and stabilization control. Further, a magnetic stripe read is not necessary, which saves cost and weight, and on aircraft, weight is an important consideration.

Figure 5:
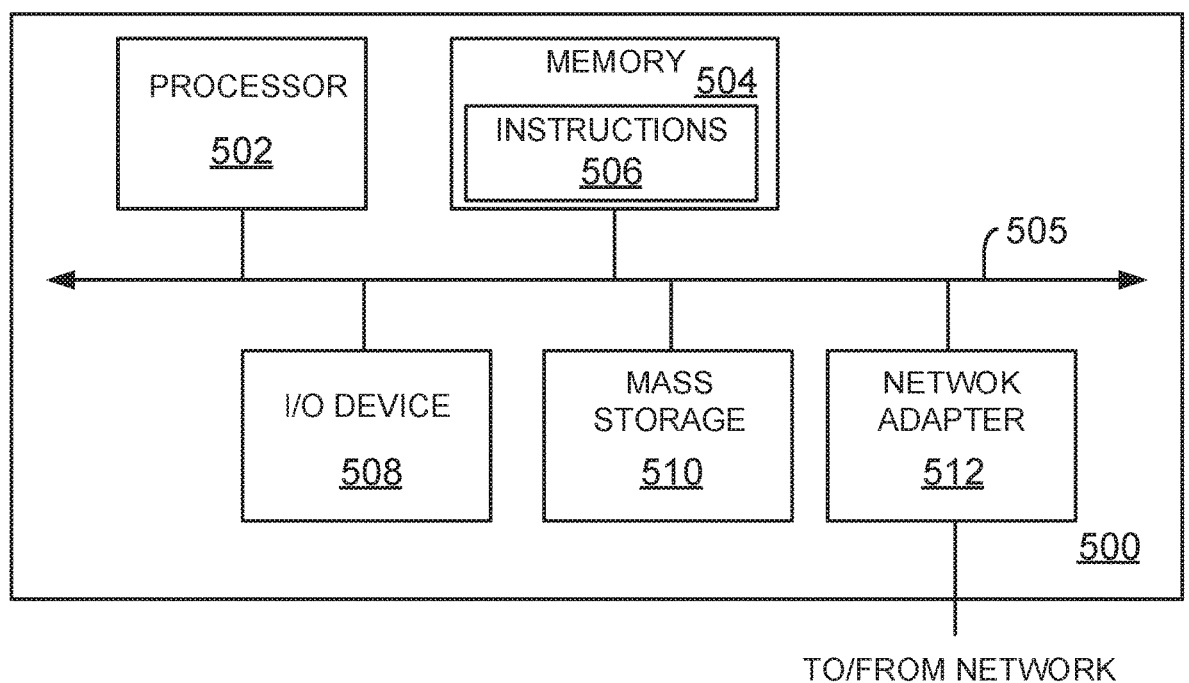
FIG. 5 shows an example of a hardware based, processing system, used according to one aspect of the present disclosure.

Processing System:

FIG. 5 is a high-level block diagram showing an example of the architecture of a processing system 500 that may be used according to one aspect. The processing system 500 can represent computing systems 106 and/or 112, user system 114 or any other device. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIG. 4 described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic, optical, or semiconductor based disks.

The network adapter 512 provides the processing system 500 with the ability to communicate with remote devices (e.g., over a network) and may be, for example, an Ethernet adapter or the like.

The processing system 500 also includes one or more input/output (I/O) devices 508 coupled to the bus system 505. The I/O devices 508 may include, for example, a display device, a keyboard, a mouse, etc.

A method and apparatus for capturing transaction information on a transportation vehicle have been described in the foregoing paragraphs. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
   initializing a selectable transaction mode presented by a seat device of an entertainment system of a transportation vehicle for using a transaction card having a front portion and a rear portion;
   providing instructions by the seat device to place the transaction card in front of a camera of the seat device; wherein the instructions are in at least one of text, audio and video:
   adjusting lighting from the seat device to capture an image of the transaction card, upon selection of the selectable transaction mode; wherein lighting adjustment from the seat device is based on illumination around the seat device;
   wherein the seat device displays one of an all-white background for maximum brightness to capture the image, and a colored background based on a detected color of the transaction card, after the transaction card is placed in front of the camera in response to the instructions;
   capturing the image of the transaction card using the camera of the seat device; wherein the image of the transaction card is at least one of the front portion and the rear portion of the transaction card and processing the image of the transaction card and extracting transaction card information from the image of the transaction card for executing a transaction.

2. The method of claim 1, wherein the transportation vehicle is an aircraft.

3. The method of claim 1, wherein the transaction card is one of a credit card, a debit card, a frequent flier card and a membership card.

4. The method of claim 1, wherein optical character recognition is used to extract information from the image of the transaction card.

5. The method of claim 1, wherein a transaction card number and an expiration date are extracted from the image.

6. The method of claim 1, wherein a name and a security code are extracted from the image.

7. The method of claim 1, wherein the transportation vehicle is one of a train, a bus, a boat and a recreation vehicle.

8. A machine implemented method, comprising: selecting a transaction mode presented by a seat device of an in-flight entertainment system of an aircraft to begin capturing an image of a first portion of a transaction card;
   providing instructions by the seat device to place the transaction card in front of a camera of the seat device;
   wherein the instructions are in at least one of text, audio and video adjusting lighting from the seat device to capture an image of the transaction card, upon selection of the transaction mode;
   wherein lighting adjustment from the seat device is based on illumination around the seat device;
   presenting a background at a display of the seat device to capture the image of the first portion of the transaction card, where a displayed background is an all-white background for maximum brightness or is colored based on a color of the transaction card; capturing the image of the first portion of the transaction card by the camera of the seat device;
   wherein the first portion is at least one of the front portion and rear portion of the transaction card; and extracting information from the image of the first portion of the transaction card for using the transaction card at the aircraft.

9. The method of claim 8, wherein the transaction card is one of a credit card, a debit card, a frequent flier card and a membership card.

10. The method of claim 8, wherein a transaction card number is extracted from the image.

11. The method of claim 8, wherein a name and an expiration date are extracted from the image.

12. The method of claim 8, wherein optical character recognition is used to extract information from the image of the transaction card.

13. The method of claim 8, wherein a security code is extracted from the image.

14. A system, comprising: a memory containing machine readable medium comprising machine executable code having stored thereon instructions; and a processor module coupled to the memory, the processor module configured to execute the machine executable code to:
   initialize a selectable transaction mode presented by a seat device of an entertainment system of a transportation vehicle for using a transaction card having a front portion and a rear portion; provide instructions by the seat device to place the transaction card in front of a camera of the seat device; wherein the instructions are in at least one of text, audio and video:
   adjust lighting from the seat device to capture an image of the transaction card, upon selection of the transaction mode;

wherein the lighting adjustment is based on illumination around the seat device;
wherein the seat device displays one of an-all white background for maximum brightness to capture the image and a colored background based on a detected color of the transaction card, after the transaction card is placed in front of the camera in response to the instructions;
capture the image of the transaction card using the camera of the seat device; wherein the image of the transaction card is at least one of the front portion and rear portion of the transaction card; and process the image of the transaction card and extract transaction card information from the image of the transaction card for executing a transaction.

15. The system of claim 14, wherein the transportation vehicle is an aircraft.

16. The system of claim 14, wherein the transaction card is one of a credit card, a debit card and a membership card.

17. The system of claim 14, wherein optical character recognition is used to extract information from the image of the transaction card.

18. The system of claim 14, wherein a transaction card number and an expiration date are extracted from the image.

19. The system of claim 14, wherein a name and a security code are extracted from the image.

20. The system of claim 14, wherein the transportation vehicle is one of a train, a bus, a boat and a recreation vehicle.

* * * * *